United States Patent [19]

Staniforth

[11] 4,392,595
[45] Jul. 12, 1983

[54] APPARATUS FOR DISPENSING PARTICULATE MATERIAL

[75] Inventor: Eric Staniforth, Macclesfield, England

[73] Assignee: Sisis Equipment (Macclesfield) Limited, Macclesfield, England

[21] Appl. No.: 193,446

[22] Filed: Oct. 3, 1980

[30] Foreign Application Priority Data

Oct. 3, 1980 [GB] United Kingdom ............... 7934272

[51] Int. Cl.³ ............................................ B65G 27/12
[52] U.S. Cl. ................................... 222/619; 222/199
[58] Field of Search ............... 222/199, 200, 613, 614, 222/619, 620, 625, 612

[56] References Cited

U.S. PATENT DOCUMENTS

| 798,001 | 8/1905 | Wilson | 222/199 |
|---|---|---|---|
| 1,343,286 | 6/1920 | Schutter | 222/199 |
| 1,516,954 | 11/1924 | Cole | 222/619 X |
| 1,880,287 | 10/1932 | Sifton | 222/199 X |
| 1,968,161 | 7/1934 | Nix | 222/199 X |
| 2,338,882 | 1/1944 | Todd | 222/620 X |
| 2,854,172 | 9/1958 | Buhr et al. | 222/612 X |
| 4,288,008 | 9/1981 | Amblard | 222/614 X |

FOREIGN PATENT DOCUMENTS

| 233659 | 9/1925 | United Kingdom . |
|---|---|---|
| 273052 | 6/1927 | United Kingdom . |
| 407423 | 3/1934 | United Kingdom . |
| 779764 | 7/1957 | United Kingdom . |
| 858413 | 1/1961 | United Kingdom . |

*Primary Examiner*—Stanley H. Tollberg
*Attorney, Agent, or Firm*—Fleit, Jacobson & Cohn

[57] ABSTRACT

Apparatus for spreading particulate material comprises a frame; a hopper supported by the frame, the hopper having a lower gravity-fed outlet aperture; a feed platform at said aperture; means for reciprocating the feed platform at said aperture relatively slowly in one direction and relatively quickly in the opposite direction; and an adjustable gate forming part of the hopper wall; all whereby the particulate material is dispensed from said hopper, beneath said gate when appropriately adjusted, by the feed platform as it reciprocates. Such apparatus may include a driven rotary feed brush for sweeping the fed particulate material in a downward direction, and constitutes a simple and inexpensive means for spreading top dressing and the like in an efficient manner.

7 Claims, 2 Drawing Figures

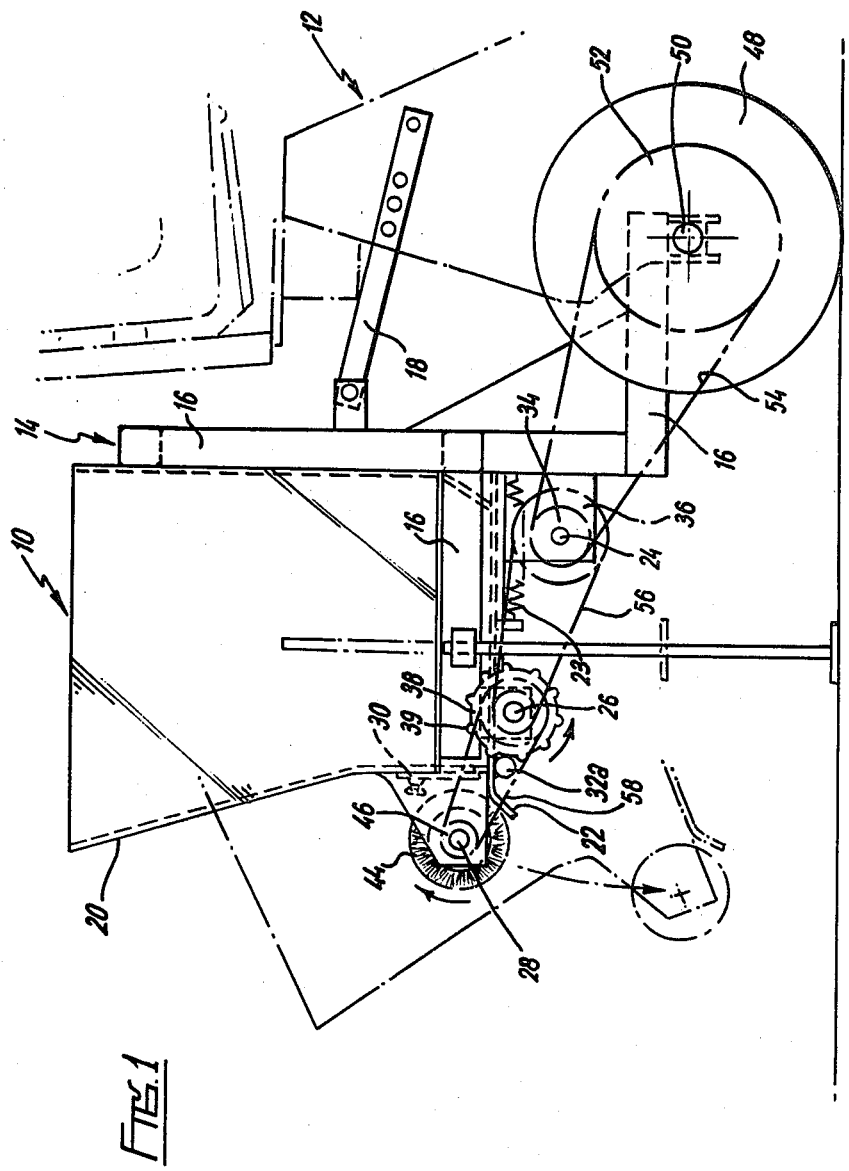

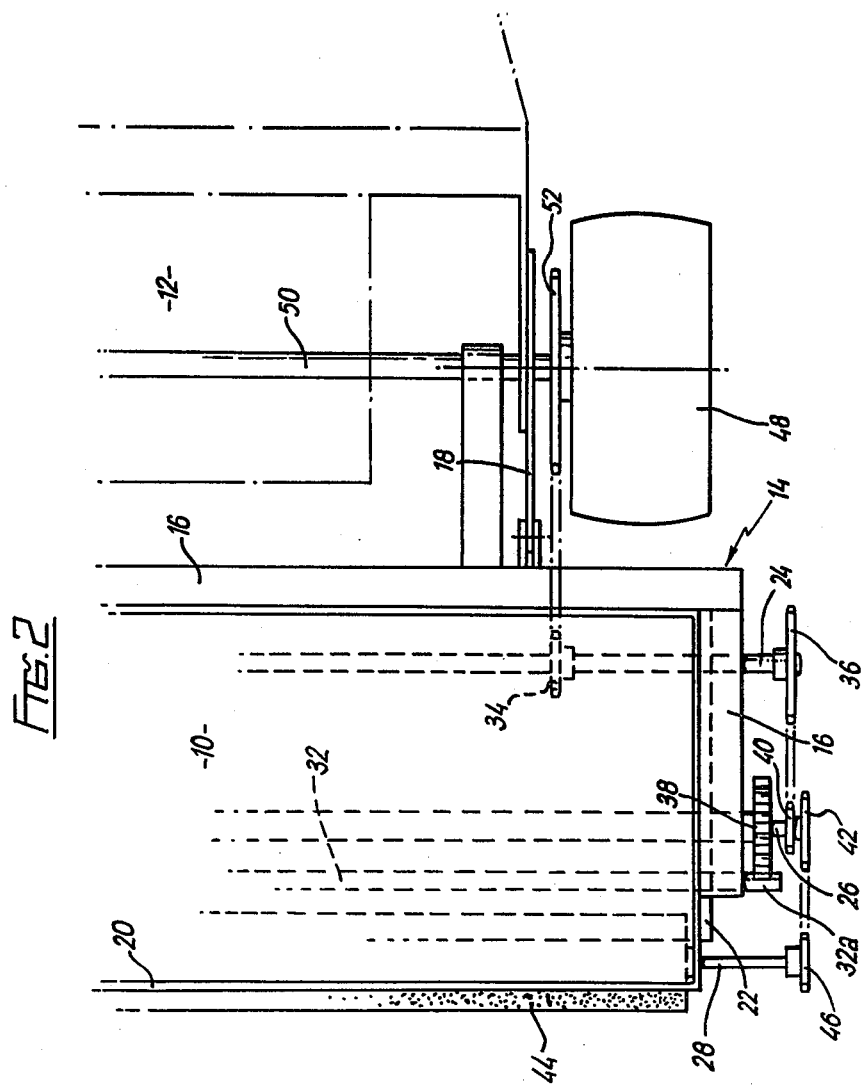

APPARATUS FOR DISPENSING PARTICULATE MATERIAL

This invention concerns apparatus for spreading particulate material. More particularly, it is concerned with this spreading of particulate material such as top dressing for turf. Top dressing for turf comprises for example, materials as sand, clay, peat and the like, and is therefore of a coarse nature, and has a tendency not to be very free-flowing. For these reasons it has often been spread over the turf surface to be treated by manual means. However, machines are marketed for spreading it, but, so far as we are aware, they all involve the use of expensive endless moving conveyor means.

The object of the present invention is to provide apparatus for spreading particulate material, especially top dressing or like material, which is of simple construction (and therefore cheaper) than the known machines referred to, and which is effective to spread the material in an efficient manner.

According to the present invention apparatus for spreading particulate material comprises a frame; a hopper supported by the frame, the hopper having a lower gravity-feed, outlet aperture; a feed platform at said aperture; means for reciprocating the feed platform at said aperture, relatively slowly in one direction and relatively quickly in the opposite direction; and an adjustable gate forming part of the hopper wall; all whereby the particulate material is dispensed from said hopper, beneath said gate when appropriately adjusted, by the feed platform as it reciprocates.

Preferably the means for reciprocating the feed platform consists of driven cams which are in abutment with a follower secured to the feed platform. It is also preferred that one edge of the feed platform extends beyond the hopper aperture beneath the adjustable gate, before inclining downwardly, and that a driven rotary brush be provided for sweeping the fed particulate material in a downward direction.

In order that the apparatus may have practical versatility, it is arranged for attachment behind a small tractor or the like and for the derivation of a drive from a ground wheel thereof, to the cams and the brush (if used), and means for adjusting the inclination of the hopper and the feed platform is provided.

The invention will now be described further, by way of example only, with reference to the accompanying drawings, in which:

FIG. 1 is a side elevation of apparatus according to the invention; and

FIG. 2 is a partial plan view corresponding to FIG. 1.

The apparatus 10 is designed to be mounted behind a small tractor 12 by means of its frame 14. The frame 14 is constructed from suitable metal sections 16 and includes a pivotable arm or arms 18, which provides an adjustable connection between the apparatus 10 and the tractor 12 whereby the inclination of the apparatus relative to the ground may be varied (see the dash-dot lines and arrow in FIG. 1).

The frame 14 supports a hopper 20, a feed platform 22 disposed at the base outlet aperture of the hopper 20 so as to be reciprocable from left to right and back in the drawings, and three shafts 24, 26, 28. The movement of the feed platform 22, to the left takes place against the influence of a tension spring 23 secured between the platform 22 and the frame 14. (FIG. 1) The hopper 20 incorporates an adjustable vertical gate 30 across its rear end. Beneath the feed platform 22 is welded a rod 32, each end of which acts as a cam follower 32a. The shaft 24 carries sprockets 34, 36; the shaft 26, cams 38, one at each end and sprockets 40, 42 (FIG. 2); and the shaft 28, a rotary brush 44, and sprocket 46. The rear ground wheel 48 of the tractor 12 carries, on its axle 50, a sprocket 52, and drive chains 54, 56, 58 cause the cams 38 and the brush 44 to be rotated as the tractor progresses over the ground.

In use, particulate material is loaded into the hopper 20, and the gate 30 fixed in an open position. The apparatus 10, with the arm 18 adjusted and fixed so that the feed platform 22 is approximately horizontal, is then towed by the tractor 12 over the turf to be treated. As the cams 38 rotate, equispaced peripheral protuberances 39 lying in an axial direction successively engage the follower 32a. As a result the platform 22 is caused to reciprocate, first moving towards the gate 30 and then snapping back under the influence of the spring 23, and so on. This reciprocating movement causes particulate material to be moved along the platform and under the gate 30, to be projected by the brush 44 onto the turf. In order to adjust the feed to the desired rate it may be necessary to adjust the height of the gate 30 or the inclination of the apparatus, or both.

It has been found that the particulate material, especially if it is top dressing is distributed very effectively and in a suitable regular manner, over the turf. The action of the brush 44 aids in ensuring that the material penetrates well into the turf.

We claim:

1. Apparatus for spreading particulate material comprising a frame; a hopper supported by the frame, the hopper having a wall in which is provided a lower gravity feed outlet aperture; an adjustable gate forming part of said hopper wall for controlling the size of said feed outlet aperture; a feed platform forming a base of said hopper and extending away from the feed outlet aperture to define a material discharge edge that receives material from said hopper through said outlet aperture; means for reciprocating the feed platform with respect to said aperture while maintaining constant the distance between said feed platform and said adjustable gate, said means for reciprocating including means for moving the material discharge edge of said feed platform relatively slow in one direction away from the outlet aperture and means for moving the feed platform relatively fast in the opposite direction; the particulate material being dispensed from said hopper through said outlet aperture onto said feed platform, the feed platform carrying the material therewith as it moves in said one direction and being movable with respect to the material as it moves in the opposite direction.

2. Apparatus for spreading particulate material as claimed in claim 1 in which the means for reciprocating the feed platform consists of driven cams which are in abutment with a follower secured to the feed platform, the relationship between said cams and said follower being such that said feed platform reciprocates only linearly.

3. Apparatus as claimed in claim 1 in which a portion of the feed platform extends beyond the feed outlet aperture beneath the adjustable gate, before inclining downwardly, and, in which a driven rotary feed brush is provided for sweeping the particulate material from said feed platform in a downward direction.

4. Apparatus as claimed in claim 3 in which said frame carries means for attaching said apparatus behind a small tractor or the like and in which said apparatus further comprises drive means for driving said means for reciprocating, said drive means being connectable to the tractor for the derivation of a drive from a ground wheel thereof.

5. Apparatus for spreading particulate material as claimed in claim 4 in which the means for reciprocating the feed platform consists of driven cams which are in abutment with a follower secured to the feed platform, the relationship between said cams and said follower being such that said feed platform reciprocates only linearly, said drive means rotatably driving said cams and said brush.

6. Apparatus as claimed in claim 4 or 5, wherein said means for attaching provides means for adjusting the inclination of the hopper and the feed platform with respect to the tractor.

7. Apparatus for spreading particulate material comprising:
- a frame;
- a hopper supported by the frame, the hopper having a lower gravity feed outlet aperture;
- a feed platform forming the base of said hopper and receiving material from said hopper through said feed outlet aperture, said feed platform having a material discharge edge for discharging the received material;
- means for reciprocating the feed platform with respect to said aperture, said means for reciprocating including means for moving said feed platform in a first direction so that said material discharge edge is moved relatively slowly in a direction away from the feed outlet aperture and means for moving said feed platform relatively fast in a direction opposite said one direction;
- an adjustable gate forming part of the hopper wall for controlling the size of said feed outlet aperture, the particulate material being dispensed from said hopper through said outlet aperture onto said feed platform, the particulate material falling from said material discharge edge of said feed platform to be spread as said feed platform reciprocates; and
- means for attaching said frame to a towing vehicle, said means for attaching including means for adjusting the inclination of the frame with respect to the towing vehicle so as to vary the rate of discharge from said hopper.

* * * * *

UNITED STATES PATENT AND TRADEMARK OFFICE
CERTIFICATE OF CORRECTION

PATENT NO. : 4,392,595
DATED : Jul. 12, 1983
INVENTOR(S) : Eric STANIFORTH

It is certified that error appears in the above—identified patent and that said Letters Patent are hereby corrected as shown below:

On the title page after [30] Foreign Application Priority Data the priority should read:

--Oct.3, 1979 [GB] United Kingdom .........7934272--

Signed and Sealed this

Twenty-seventh Day of March 1984

[SEAL]

Attest:

GERALD J. MOSSINGHOFF

Attesting Officer *Commissioner of Patents and Trademarks*